(12) United States Patent
Otterbach et al.

(10) Patent No.: US 11,960,972 B1
(45) Date of Patent: *Apr. 16, 2024

(54) USING A QUANTUM PROCESSOR UNIT TO PREPROCESS DATA

(71) Applicant: Rigetti & Co, LLC, Berkeley, CA (US)

(72) Inventors: Johannes Sebastian Otterbach, Oakland, CA (US); Christopher Mogan Wilson, Toronto (CA); Marcus Palmer da Silva, Lafayette, CA (US); Nikolas Anton Tezak, Oakland, CA (US); Gavin Earl Crooks, Berkeley, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,143

(22) Filed: Jan. 6, 2023

Related U.S. Application Data

(63) Continuation of application No. 16/408,052, filed on May 9, 2019, now Pat. No. 11,551,127.
(Continued)

(51) Int. Cl.
  *G06N 10/00* (2022.01)
  *G06F 15/16* (2006.01)
  *G06F 17/18* (2006.01)

(52) U.S. Cl.
  CPC .............. *G06N 10/00* (2019.01); *G06F 15/16* (2013.01); *G06F 17/18* (2013.01)

(58) Field of Classification Search
  CPC .......... G01V 3/083; G01V 3/12; G06N 10/00; G06N 10/20; G06N 10/40; G06N 20/10; H03K 19/195; G06F 15/16; G06F 17/18
  See application file for complete search history.

(56) References Cited

U.S. PATENT DOCUMENTS

| 9,836,699 B1 | 12/2017 | Rigetti et al. |
| 10,255,555 B2 | 4/2019 | Curtis et al. |

(Continued)

FOREIGN PATENT DOCUMENTS

| WO | 2017031356 | 2/2017 |
| WO | 2020033807 | 2/2020 |

OTHER PUBLICATIONS

Yang, et al., "Optimizing Variational Quantum Algorithms Using Pontryagin's Minimum Principle", Phys.Rev. X 7, 021027, May 18, 2017, 10 pgs.
(Continued)

*Primary Examiner* — Terrell S Johnson
(74) *Attorney, Agent, or Firm* — Henry Patent Law Firm PLLC

(57) ABSTRACT

In a general aspect, input data for a computer process are preprocessed by a preprocessor unit that includes a quantum processor. In some aspects, a preprocessor unit obtains input data for a computer process that is configured to run on a computer processing unit. Randomized parameter values are computed for variable parameters of a quantum logic circuit based on the input data. A classical processor in the preprocessor unit computes the randomized parameter values from the input data and a set of random numbers. A quantum processor in the preprocessor unit produces quantum processor output data by executing the quantum logic circuit having the randomized parameter values assigned to the variable parameters. Preprocessed data generated based on the quantum processor output data are then provided as the input for the computer process configured to run on the computer processing unit.

22 Claims, 4 Drawing Sheets

Related U.S. Application Data

(60) Provisional application No. 62/680,779, filed on Jun. 5, 2018, provisional application No. 62/669,169, filed on May 9, 2018.

(56) References Cited

U.S. PATENT DOCUMENTS

| | | | |
|---|---|---|---|
| 10,268,232 B2 | 4/2019 | Harris et al. | |
| 10,374,612 B1 | 8/2019 | Sinclair et al. | |
| 11,334,693 B1 | 5/2022 | Flammia | |
| 11,694,108 B2 | 7/2023 | Tezak et al. | |
| 2009/0182542 A9* | 7/2009 | Hilton | B82Y 10/00 703/11 |
| 2014/0297247 A1 | 10/2014 | Troyer et al. | |
| 2016/0267032 A1 | 9/2016 | Rigetti et al. | |
| 2016/0292586 A1 | 10/2016 | Rigetti et al. | |
| 2017/0177534 A1 | 6/2017 | Mohseni et al. | |
| 2018/0096085 A1* | 4/2018 | Rubin | G16C 10/00 |
| 2018/0114138 A1 | 4/2018 | Monroe et al. | |
| 2018/0232652 A1 | 8/2018 | Curtis et al. | |
| 2018/0260245 A1 | 9/2018 | Smith | |
| 2018/0260730 A1 | 9/2018 | Reagor et al. | |
| 2018/0365585 A1 | 12/2018 | Smith et al. | |
| 2020/0169396 A1 | 5/2020 | Neven et al. | |
| 2022/0164693 A1* | 5/2022 | Tezak | G06N 10/40 |

OTHER PUBLICATIONS

KIPO, International Search Report and Written Opinion mailed Nov. 25, 2019, in PCT/US2019/045866, 12 pgs.
USPTO, Non-Final Office Action mailed Sep. 22, 2022, in U.S. Appl. No. 17/168,634, 33 pgs.
"Neural Networks, Manifolds, and Topology", URL:http://colah.github.io/posts/2014-03-NN-Manifolds-Topology/, Apr. 6, 2014, 13 pgs.
Aaronson, et al., "The Computational Complexity of Linear Optics", arXiv:1011.3245v1, Nov. 14, 2010, 94 pgs.
Aharonov, et al., "Fault-Tolerant Quantum Computation with Constant Error Rate", SIAM Journal of Computing 38(4), Jul. 2008, 76 pgs.
Aliferis, et al., "Quantum Accuracy Threshold for Concatenated Distance-3 Codes", Quantum Information and Computation 6(2), 2006, 69 pgs.
Benedetti, et al., "A generative modeling approach for benchmarking and training shallow quantum circuits", arXiv:1801.07686v1 [quant-ph], Jan. 23, 2018, 14 pgs.
Brandao, et al., "Quantum SDP Solvers: Large Speed-ups, Optimality, and Applications to Quantum Learning", arXiv:1710.02581, Apr. 22, 2019, 40 pgs.
Brandao, et al., "Quantum Speed-Ups for Solving Semidefinite Programs", 58th Annual IEEE Symposium on Foundations of Computer Science, 2017, 12 pgs.
Bremner, et al., "Achieving quantum supremacy with sparse and noisy commuting quantum computations", Quantum 1, 8, 2017, 23 pgs.
Cross, et al., "Quantum learning robust against noise", Phys.Rev. A 92, Jul. 27, 2015, 5 pgs.
Cross, et al., "Quantum learning robust to noise", arXiv:1407.5088v1, Jul. 18, 2014, 6 pgs.
Farhi, E., et al., "A Quantum Approximate Optimization Algorithm", arXiv:1411.4028v1 [quant-ph], Nov. 14, 2014, 16 pages.
Farhi, et al., "Classification with Quantum Neural Networks on Near Term Processors", arXiv:1802.06002v1, Feb. 16, 2018, 21 pgs.
Farhi, et al., "Quantum Algorithms for Fixed Qubit Architectures", arXiv:1703.06199v1, Mar. 17, 2017, 20 pgs.
Farhi, E., et al., "Quantum Supremacy through the Quantum Approximate Optimization Algorithm", arXiv:1602.07674v1 [quant-ph], Feb. 24, 2016, 22 pages.
Fujii, et al., "Harnessing disordered quantum dynamics for machine learning", arXiv:1602.08159v1, Feb. 26, 2016, 19 pgs.

Fujii, et al., "Harnessing Disordered-Ensemble Quantum Dynamics for Machine Learning", PhysRevApplied.8.024030, Aug. 30, 2017, 22 pgs.
Grant, et al., "Hierarchical quantum classifiers", arXiv:1804.03680v1, Apr. 10, 2018, 15 pgs.
Harrow, et al., "Quantum Algorithm for Linear Systems of Equations", Phys.Rev.Lett. 103, Oct. 7, 2009, 4 pgs.
Harrow, et al., "Quantum algorithm for solving linear systems of equations", arXiv:0811.3171v3, Sep. 30, 2009, 16 pgs.
Havlicek, et al., "Supervised learning with quantum enhanced feature spaces", arXiv:1804.11326v1, Apr. 30, 2018, 21 pgs.
Havlicek, et al., "Supervised learning with quantum enhanced feature spaces", arXiv:1804.11326v2 [quant-ph], Jun. 5, 2018, 22 pgs.
Hofmann, et al., "Kernel Methods in Machine Learning", Ann. Statist. vol. 36, No. 3, 1171-1220, 2008, 50 pgs.
Huggins, et al., "Towards Quantum Machine Learning with Tensor Networks", arXiv:1803.11537v1, Mar. 30, 2018, 10 pgs.
Kandala, et al., "Hardware-efficient Variational Quantum Eigensolver for Small Molecules and Quantum Magnets", arXiv:1704.05018, Oct. 13, 2017, 26 pgs.
Kandala, et al., "Hardware-efficient variational quantum eigensolver for small molecules and quantum magnets", Nature 549, Sep. 14, 2017, 5 pgs.
Kerenidis, et al., "Quantum Recommendation Systems", arXiv:1603.08675v3, Sep. 22, 2016, 22 pgs.
Knill, et al., "Resilient Quantum Computation", Science 279(5349), 1998, 4 pgs.
Lecun, et al., "Gradient-Based Learning Applied to Document Recognition", Proceedings of the IEEE, vol. 86, No. 11, Nov. 1998, 47 pgs.
Lloyd, et al., "Quantum principal component analysis", Nature Physics Letters, Jul. 27, 2014, 3 pgs.
Lloyd, et al., "Quantum principal component analysis", arXiv:1307.0401, Sep. 16, 2013, 10 pgs.
May, et al., "Kernel Approximation Methods for Speech Recognition", arXiv:1701.03577v1, Jan. 13, 2017, 31 pgs.
Nielsen, et al., "Quantum Computation and Quantum Information", Cambridge Univ. Press, 2010, 704 pgs.
Pathak, et al., "Model-Free Prediction of Large Spatiotemporally Chaotic Systems from Data: A Reservoir Computing Approach", Physical Review Letters 120, 024102, Jan. 12, 2018, 5 pgs.
Peruzzo, Alberto, et al., "A Variational Eigenvalue Solver on a Photonic Quantum Processor", Nature Communications, DOI: 10.1038/ncomms5213, Jul. 23, 2014, 7 pgs.
Preskill, "quantum Computing in the NISQ era and beyond", arXiv:1801.00862v2, Jan. 27, 2018, 22 pgs.
Rahimi, et al., "Random Features for Large-Scale Kernel Machines", Advances in Neural Information Processing Systems (NIPS), 2007, 13 pgs.
Rahimi, et al., "Reflections on Random Kitchen Sinks", http://www.argmin.net/2017/12/05/kitchen-sinks, Dec. 5, 2017, 10 pgs.
Rahimi, et al., "Uniform Approximation of Functions with Random Bases", https://ieeexplore.ieee.org/document/4797607, 2008, 7 pgs.
Rahimi, et al., "Weighted Sums of Random Kitchen Sinks: Replacing minimization with randomization in learning", Advances in Neural Information Processing Systems (NIPS), 2008, 13 pgs.
Rebentrost, et al., "Quantum support vector machine for big data classification", arXiv:1307.0471, Jul. 10, 2014, 6 pgs.
Rebentrost, et al., "Quantum Support Vector Machine for Big Data Classification", Phys.Rev.Lett. 113, 130503, Sep. 25, 2014, 5 pgs.
Schoelkopf, et al., "Learning with kernels: support vector machines, regularizaiton, optimization, and beyond", MIT Press, 2002, 639 pgs.
Schuld, et al., "Circuit-centric quantum classifiers", arXiv: 1804.00633v1 [quant-ph], Apr. 2, 2018, 17 pgs.
Schuld, et al., "Quantum machine learning in feature Hilbert spaces", arXiv:1803.07128v1 [quant-ph], Mar. 19, 2018, 12 pgs.
Smith, R. S., et al., "A Practical Quantum Instruction Set Architecture", arXiv:1608.03355v2 [quant-ph], Feb. 17, 2017, 15 pages.
Smith, Robert S, et al., "A Practical Quantum Instruction Set Architecture", arXiv:1608.03355v1 [quant-ph], Aug. 11, 2016, 14 pages.

(56) References Cited

OTHER PUBLICATIONS

Wiskott, et al., "Slow Feature Analysis: Unsupervised Learning of Invariances", Neural Computation 14, 715-770, 2002, 56 pgs.
Wolchover, "Chaos Theory: Machine Learning's "Amazing" Ability to Predict Chaos", Quanta magazine; https://www.quantamagazine.org/machine-learnings-amazing-ability-to-predict-chaos-20180418/, Apr. 18, 2018, 5 pgs.

* cited by examiner

US 11,960,972 B1

USING A QUANTUM PROCESSOR UNIT TO PREPROCESS DATA

CROSS-REFERENCE TO RELATED APPLICATIONS

This application is a continuation of U.S. patent application Ser. No. 16/408,052, filed May 9.2019, which claims priority to U.S. Provisional Application No. 62/669,169 filed May 9, 2018 and entitled "Using a Quantum Processor Unit to Preprocess Data;" and to U.S. Provisional Application No. 62/680,779 filed Jun. 5, 2018 and entitled "Using a Quantum Processor Unit to Preprocess Data." The entire contents of the above-referenced priority applications, including all text, drawings and appendices, are hereby incorporated by reference.

BACKGROUND

The following description relates to using a quantum processor unit to preprocess data.

Quantum computers can perform computational tasks by executing quantum algorithms. A quantum algorithm can be represented, for example, as a quantum Hamiltonian, a sequence of quantum logic operations, a set of quantum machine instructions, or otherwise. A variety of physical systems have been proposed as quantum computing systems. Examples include superconducting circuits, trapped ions, spin systems and others.

DETAILED DESCRIPTION

Figure 1:
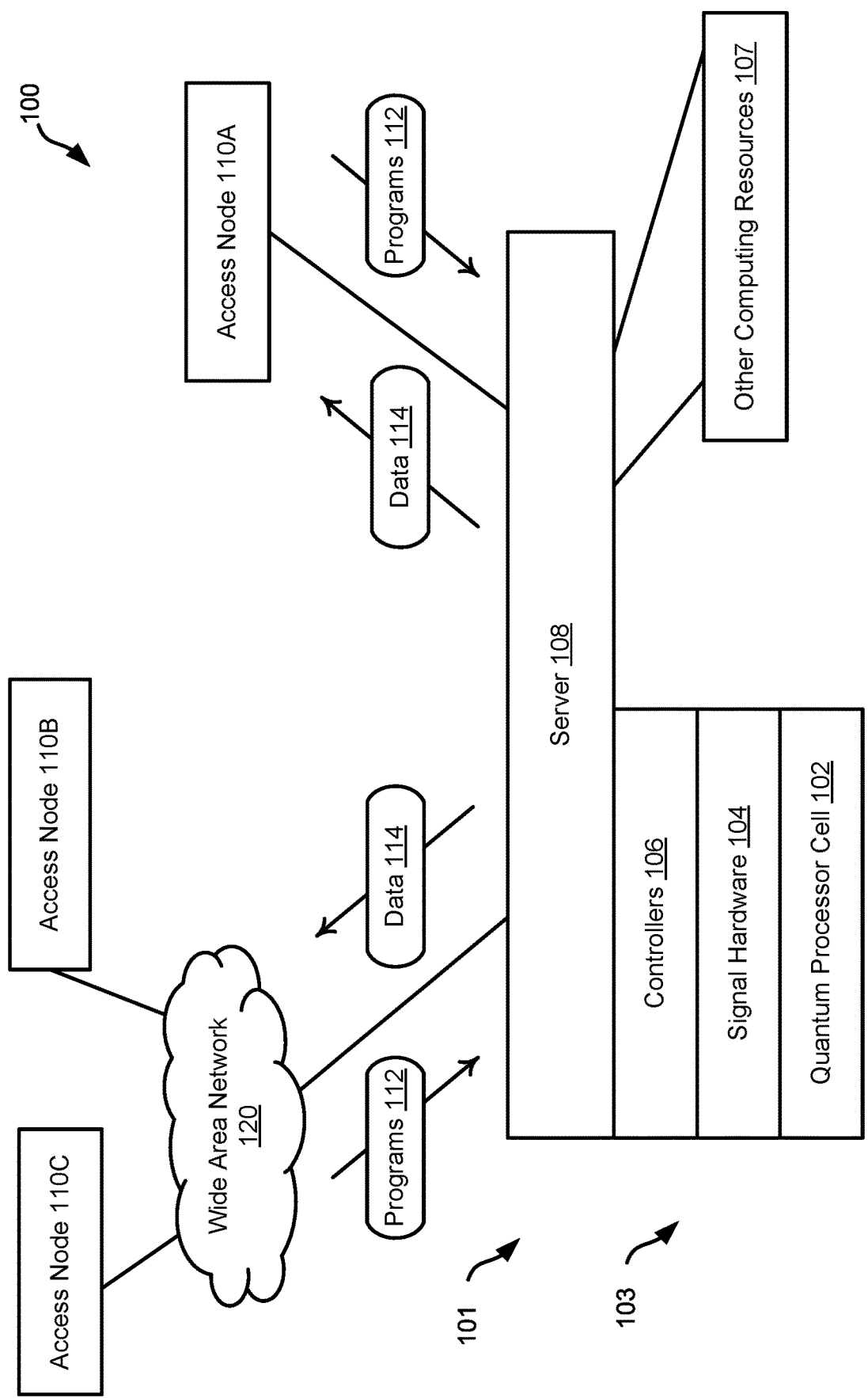
FIG. 1 is a block diagram of an example computing system.

In some aspects of what is described here, a quantum processor unit (QPU) can be used to preprocess input data for a variety of classical or quantum data processing algorithms and systems, which can improve the performance of such classical or quantum data processing algorithms and systems. In some implementations, the intrinsically quantum nonlinearity of a QPU is used to preprocess data for a computationally-intensive algorithm executed by another computer system or to replace computationally-intensive steps of an algorithm executed by another computer system. In some examples, the QPU preprocesses data for a machine learning algorithm, an image processing algorithm, an audio or signal processing algorithm, a logistic regression algorithm, or another type of computationally-intensive algorithm executed by a computer system. The publication entitled "Quantum Kitchen Sinks" by C. M. Wilson et al., arXiv:1806.08321v1 [quant-ph] 21 Jun. 2018, (available at https://arxiv.org/pdf/1806.08321.pdf), which is hereby incorporated by reference, includes specific examples where a QPU preprocesses data to enhance performance of a linear classifier algorithm. The techniques described here can be applied to these and other types of algorithms and systems.

In some aspects, the preprocessing techniques and systems described here use randomized quantum logic circuits (as opposed to, for example, optimized quantum logic circuits), which can increase the efficiency of QPU usage and may permit deployment on existing or near-term quantum computers. The effect of the randomized circuit can be associated with an implied kernel function. In some cases, the randomized quantum logic circuit applied by the QPU corresponds to a nonlinear transformation to a higher dimensional space, which can be exploited to improve subsequent processing (e.g., in a machine learning system, an image processing system, or otherwise).

In some implementations, the preprocessing techniques and systems described here provide technical advantages and improvements over existing approaches. For instance, in various cases, the preprocessing techniques and systems described here may be implemented in a manner that provides one or more of the following features: does not rely on parameter optimization of hybrid algorithms (e.g., does not rely on optimization of rotation angles as in the quantum approximate optimization algorithm, or optimization of other quantum circuit parameters as in other types of hybrid algorithms), which can reduce QPU time with respect to some existing approaches; does not rely on nonlinear classical pre- or post-processing; may exploit the intrinsic quantum nonlinearity of a QPU to enhance the performance of other classical or quantum algorithms; is not inherently limited by the number of qubits on a chip; does not require deep circuits (e.g., the technique may utilize quantum circuits of extremely low depth, even working with only one single-qubit rotation in some instances, which can be deployed on existing and near-term quantum computers); can be used on datasets whose dimensionality p is significantly larger than the number of qubits, Q, available on the QPU (e.g., an embedding technique can be used to apply a limited number of qubits to a higher-dimensional dataset); may be resilient to moderate levels of noise (e.g., suitable for existing and near-term quantum computers); does not rely on averaging of repeated quantum measurements to produce an essentially classical expectation value (e.g., can work with single-shot quantum measurements), but does not preclude averaging; does not depend on any specific chip topology or QPU architecture (e.g., does not depend on physical modality of quantum information encoding and processing).

FIG. 1 is a block diagram of an example computing system 100. The example computing system 100 shown in FIG. 1 includes a computing environment 101 and access nodes 110A, 110B, 110C. A computing system may include additional or different features, and the components of a computing system may operate as described with respect to FIG. 1 or in another manner.

The example computing environment 101 includes computing resources and exposes their functionality to the access nodes 110A, 110B, 110C (referred to collectively as "access nodes 110"). The computing environment 101 shown in FIG. 1 includes a server 108, a quantum processor unit 103 and other computing resources 107. The computing environment 101 may also include one or more of the access nodes (e.g., the example access node 110A) and other features and components. In some instances, the access node 110A may be a low latency access node situated in close physical proximity to the server 108; such a low latency access node is particularly suitable for programs, such as iterative programs, where the time for data 114 and programs 112 to be transmitted between the server 108 and the access node 110A can be reduced to a nominal time compared to the time for running the iteration on the quantum processor unit 103. Furthermore, in other instances a program, such as an iterative program, may be run directly from the server 108 or even from a processor within the controller 106 to further reduce the run time (e.g., per iteration), if needed. A computing environment may include additional or different features, and the components of a computing environment may operate as described with respect to FIG. 1 or in another manner.

The example computing environment 101 can provide services to the access nodes 110, for example, as a cloud-based or remote-accessed computer, as a distributed computing resource, as a supercomputer or another type of high-performance computing resource, or in another manner. As shown in FIG. 1, to access computing resources of the computing environment 101, the access nodes 110 send programs 112 to the server 108 and in response, the access nodes 110 receive data 114 from the server 108. The access nodes 110 may access services of the computing environment 101 in another manner, and the server 108 or other components of the computing environment 101 may expose computing resources in another manner.

Any of the access nodes 110 can operate local to, or remote from, the server 108 or other components of the computing environment 101. In the example shown in FIG. 1, the access node 110A has a local data connection to the server 108 and communicates directly with the server 108 through the local data connection. The local data connection can be implemented, for instance, as a wireless Local Area Network, an Ethernet connection, or another type of wired or wireless connection. Or in some cases, a local access node can be integrated with the server 108 or other components of the computing environment 101. Generally, the computing system 100 can include any number of local access nodes.

In the example shown in FIG. 1, the access nodes 110B, 110C each have a remote data connection to the server 108, and each communicates with the server 108 through the remote data connection. The remote data connection in FIG. 1 is provided by a wide area network 120, such as, for example, the Internet or another type of wide area communication network. In some cases, remote access nodes use another type of remote data connection (e.g., satellite-based connections, a cellular network, a private network, etc.) to access the server 108. Generally, the computing system 100 can include any number of remote access nodes.

The example server 108 shown in FIG. 1 communicates with the access nodes 110 and the computing resources in the computing environment 101. For example, the server 108 can delegate computational tasks to the quantum processor unit 103 and the other computing resources 107, and the server 108 can receive the output data from the computational tasks performed by the quantum processor unit 103 and the other computing resources 107. In some implementations, the server 108 includes a personal computing device, a computer cluster, one or more servers, databases, networks, or other types of classical or quantum computing equipment. The server 108 may include additional or different features, and may operate as described with respect to FIG. 1 or in another manner.

The example quantum processor unit 103 operates as a quantum computing resource in the computing environment 101. The other computing resources 107 may include additional quantum computing resources (e.g., quantum processor units, quantum virtual machines or quantum simulators) as well as classical (non-quantum) computing resources such as, for example, digital microprocessors, specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the server 108 generates computing jobs, identifies an appropriate computing resource in the computing environment 101 to execute the computing job, and sends the computing job to the identified resource for execution. For example, the server 108 may send a computing job to the quantum processor unit 103 or any of the other computing resources 107. A computing job can be formatted, for example, as a computer program, function, code or other type of computer instruction set. Each computing job includes instructions that, when executed by an appropriate computing resource, perform a computational task and generate output data based on input data. For example, a computing job can include instructions formatted for a quantum processor unit, a quantum virtual machine, a digital microprocessor, co-processor or other classical data processing apparatus, or another type of computing resource.

In some implementations, the server 108 operates as a host system for the computing environment 101. For example, the access nodes 110 may send programs 112 to server 108 for execution in the computing environment 101. The server 108 can store the programs 112 in a program queue, generate one or more computing jobs for executing the programs 112, generate a schedule for the computing jobs, allocate computing resources in the computing environment 101 according to the schedule, and delegate the computing jobs to the allocated computing resources. The server 108 can receive, from each computing resource, output data from the execution of each computing job. Based on the output data, the server 108 may generate additional computing jobs, generate data 114 that is provided back to an access node 110, or perform another type of action.

In some implementations, all or part of the computing environment 101 operates as a cloud-based quantum computing (QC) environment, and the server 108 operates as a host system for the cloud-based QC environment. For example, the programs 112 can be formatted as quantum computing programs for execution by one or more quantum processor units. The server 108 can allocate quantum computing resources (e.g., one or more QPUs, one or more quantum virtual machines, etc.) in the cloud-based QC environment according to the schedule, and delegate quantum computing jobs to the allocated quantum computing resources for execution.

In some implementations, all or part of the computing environment 101 operates as a hybrid computing environment, and the server 108 operates as a host system for the hybrid environment. For example, the programs 112 can be formatted as hybrid computing programs, which include instructions for execution by one or more quantum processor units and instructions that can be executed by another type of computing resource. The server 108 can allocate quantum computing resources (e.g., one or more QPUs, one or more quantum virtual machines, etc.) and other computing resources in the hybrid computing environment according to the schedule, and delegate computing jobs to the allocated computing resources for execution. The other (non-quantum) computing resources in the hybrid environment may include, for example, one or more digital microprocessors, one or more specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), or other types of computing modules.

In some cases, the server 108 can select the type of computing resource (e.g., quantum or otherwise) to execute an individual computing job in the computing environment 101. For example, the server 108 may select a particular quantum processor unit (QPU) or other computing resource based on availability of the resource, speed of the resource, information or state capacity of the resource, a performance metric (e.g., process fidelity) of the resource, or based on a combination of these and other factors. In some cases, the server 108 can perform load balancing, resource testing and calibration, and other types of operations to improve or optimize computing performance.

The example server 108 shown in FIG. 1 may include a quantum machine instruction library or other resources that the server 108 uses to produce quantum computing jobs to be executed by quantum computing resources in the computing environment 101 (e.g., by the quantum processor unit 103). The quantum machine instruction library may include, for example, calibration procedures, hardware tests, quantum algorithms, quantum gates, etc. The quantum machine instruction library can include a file structure, naming convention, or other system that allows the resources in the quantum machine instruction library to be invoked by the programs 112. For instance, the server 108 or the computing environment 101 can expose the quantum machine instruction library to the access nodes 110 through a set of application programming interfaces (APIs). Accordingly, the programs 112 that are produced by the access nodes 110 and delivered to the server 108 may include information that invokes a quantum machine instruction library stored at the server 108. In some implementations, one or more of the access nodes 110 includes a local version of a quantum machine instruction library. Accordingly, the programs 112 that are produced by the access node 110B and delivered to the server 108 may include instruction sets from a quantum machine instruction library.

The example quantum processor unit 103 shown in FIG. 1 can perform quantum computational tasks by executing quantum machine instructions. In some implementations, the quantum processor unit 103 can perform quantum computation by storing and manipulating information within quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, the quantum processor unit 103 can operate using gate-based models for quantum computing. For example, the qubits can be initialized in an initial state, and a quantum logic circuit comprised of a series of quantum logic gates can be applied to transform the qubits and extract measurements representing the output of the quantum computation. In some implementations, the quantum processor unit 103 can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, quantum error correcting schemes can be deployed to achieve fault-tolerant quantum computation, or other computational regimes may be used. Pairs of qubits can be addressed, for example, with two-qubit logic operations that are capable of generating entanglement, independent of other pairs of qubits. In some implementations, more than two qubits can be addressed, for example, with multi-qubit quantum logic operations capable of generating multi-qubit entanglement. In some implementations, the quantum processor unit 103 is constructed and operated according to a scalable quantum computing architecture. For example, in some cases, the architecture can be scaled to a large number of qubits to achieve large-scale general purpose coherent quantum computing.

The example quantum processor unit 103 shown in FIG. 1 includes controllers 106, signal hardware 104, and a quantum processor cell 102. A quantum processor unit may include additional or different features, and the components of a quantum processor unit may operate as described with respect to FIG. 1 or in another manner.

In some instances, all or part of the quantum processor cell 102 functions as a quantum processor, a quantum memory, or another type of subsystem. In some examples, the quantum processor cell 102 includes a quantum circuit system. The quantum circuit system may include qubit devices, resonator devices and possibly other devices that are used to store and process quantum information. In some cases, the quantum processor cell 102 includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor cell 102. In some cases, the quantum processor cell 102 includes an ion trap system, and the qubit devices are implemented as trapped ions controlled by optical signals delivered to the quantum processor cell 102. In some cases, the quantum processor cell 102 includes a spin system, and the qubit devices are implemented as nuclear or electron spins controlled by microwave or radio-frequency signals delivered to the quantum processor cell 102. The quantum processor cell 102 may be implemented based on another physical modality of quantum computing.

In some implementations, the example quantum processor cell 102 can process quantum information by applying control signals to the qubits in the quantum processor cell 102. The control signals can be configured to encode information in the qubits, to process the information by performing quantum logic gates or other types of operations, or to extract information from the qubits. In some examples, the operations can be expressed as single-qubit logic gates, two-qubit logic gates, or other types of quantum logic gates that operate on one or more qubits. A sequence of quantum logic operations can be applied to the qubits to perform a quantum algorithm. The quantum algorithm may correspond to a computational task, a hardware test, a quantum error correction procedure, a quantum state distillation procedure, or a combination of these and other types of operations.

The example signal hardware 104 includes components that communicate with the quantum processor cell 102. The signal hardware 104 may include, for example, waveform generators, amplifiers, digitizers, high-frequency sources, DC sources, AC sources and other type of components. The signal hardware may include additional or different features and components. In the example shown, components of the signal hardware 104 are adapted to interact with the quantum processor cell 102. For example, the signal hardware 104 can be configured to operate in a particular frequency range, configured to generate and process signals in a particular format, or the hardware may be adapted in another manner.

In some instances, one or more components of the signal hardware 104 generate control signals, for example, based on control information from the controllers 106. The control signals can be delivered to the quantum processor cell 102 to operate the quantum processor unit 103. For instance, the signal hardware 104 may generate signals to implement quantum logic operations, readout operations or other types of operations. As an example, the signal hardware 104 may include arbitrary waveform generators (AWGs) that generate electromagnetic waveforms (e.g., microwave or radio-frequency) or laser systems that generate optical waveforms. The waveforms or other types of signals generated by the signal hardware 104 can be delivered to devices in the quantum processor cell 102 to operate qubit devices, readout devices, bias devices, coupler devices or other types of components in the quantum processor cell 102.

In some instances, the signal hardware 104 receives and processes signals from the quantum processor cell 102. The received signals can be generated by operation of the quantum processor unit 103. For instance, the signal hardware 104 may receive signals from the devices in the quantum processor cell 102 in response to readout or other operations performed by the quantum processor cell 102. Signals received from the quantum processor cell 102 can be mixed, digitized, filtered, or otherwise processed by the signal hardware 104 to extract information, and the information extracted can be provided to the controllers 106 or handled in another manner. In some examples, the signal hardware 104 may include a digitizer that digitizes electromagnetic waveforms (e.g., microwave or radio-frequency) or optical signals, and a digitized waveform can be delivered to the controllers 106 or to other signal hardware components. In some instances, the controllers 106 process the information from the signal hardware 104 and provide feedback to the signal hardware 104; based on the feedback, the signal hardware 104 can in turn generate new control signals that are delivered to the quantum processor cell 102.

In some implementations, the signal hardware 104 includes signal delivery hardware that interface with the quantum processor cell 102. For example, the signal hardware 104 may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processor cell 102. In some instances, signal delivery hardware performs preprocessing, signal conditioning or other operations on readout signals received from the quantum processor cell 102.

The example controllers 106 communicate with the signal hardware 104 to control operation of the quantum processor unit 103. The controllers 106 may include digital computing hardware that directly interface with components of the signal hardware 104. The example controllers 106 may include processors, memory, clocks and other types of systems or subsystems. The processors may include one or more single- or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory, a digital or quantum memory, or another type of computer storage medium. The controllers 106 may include additional or different features and components.

In some implementations, the controllers 106 include memory or other components that store quantum state information, for example, based on qubit readout operations performed by the quantum processor unit 103. For instance, the states of one or more qubits in the quantum processor cell 102 can be measured by qubit readout operations, and the measured state information can be stored in a cache or other type of memory system in or more of the controllers 106. In some cases, the measured state information is used in the execution of a quantum algorithm, a quantum error correction procedure, a quantum processor unit (QPU) calibration or testing procedure, or another type of quantum process.

In some implementations, the controllers 106 include memory or other components that store quantum machine instructions, for example, representing a quantum program for execution by the quantum processor unit 103. In some cases, the quantum machine instructions are received from the server 108 in a hardware-independent format. For example, quantum machine instructions may be provided in a quantum instruction language such as Quil, described in the publication "A Practical Quantum Instruction Set Architecture," arXiv:1608.03355v2, dated Feb. 17, 2017, or another quantum instruction language. For instance, the quantum machine instructions may be written in a format that can be executed by broad range of quantum processor units or quantum virtual machines.

In some instances, the controllers 106 can interpret the quantum machine instructions and generate a hardware-specific control sequences configured to execute the operations proscribed by the quantum machine instructions. For example, the controllers 106 may generate control information that is delivered to the signal hardware 104 and converted to control signals that control the quantum processor cell 102.

In some implementations, the controllers 106 include one or more clocks that control the timing of operations. For example, operations performed by the controllers 106 may be scheduled for execution over a series of clock cycles, and clock signals from one or more clocks can be used to control the relative timing of each operation or groups of operations. In some cases, the controllers 106 schedule control operations according to quantum machine instructions in a quantum computing program, and the control information is delivered to the signal hardware 104 according to the schedule in response to clock signals from a clock or other timing system.

In some implementations, the controllers 106 include processors or other components that execute computer program instructions (e.g., instructions formatted as software, firmware, or otherwise). For example, the controllers 106 may execute a quantum processor unit (QPU) driver software, which may include machine code compiled from any type of programming language (e.g., Python, C++, etc.) or instructions in another format. In some cases, QPU driver software receives quantum machine instructions (e.g., based on information from the server 108) and quantum state information (e.g., based on information from the signal hardware 104), and generates control sequences for the quantum processor unit 103 based on the quantum machine instructions and quantum state information.

In some instances, the controllers 106 generate control information (e.g., a digital waveform) that is delivered to the signal hardware 104 and converted to control signals (e.g., analog waveforms) for delivery to the quantum processor cell 102. The digital control information can be generated based on quantum machine instructions, for example, to execute quantum logic operations, readout operations, or other types of control.

In some instances, the controllers 106 extract qubit state information from qubit readout signals, for example, to identify the quantum states of qubits in the quantum processor cell 102 or for other purposes. For example, the controllers may receive the qubit readout signals (e.g., in the form of analog waveforms) from the signal hardware 104, digitize the qubit readout signals, and extract qubit state information from the digitized signals.

The example computing environment 101 can be configured such that the quantum processor unit 103 functions as a preprocessing unit that modifies data for subsequent processing by the access nodes 110 or other computing resources 107. In some implementations, the server 108 manages data flows between the quantum processor unit 103 and one or more classical computers, for example, in a hybrid computing regime. In this capacity, the quantum processor unit 103 may improve the effectiveness of algorithms executed by classical computers, such as those adapted for machine learning, image processing, etc. For example, the quantum processor unit 103 may improve the operation of a classical linear classifier algorithm (e.g., to distinguish between digitized images of different subjects) or another type of machine learning system. In other implementations, the server 108 manages data flows between the quantum processor unit 103 and one or more additional quantum processing units. The one or more additional quantum processing units may be deployed in the computing environment, for instance, as one or more of the other computing resources 107. In these implementations, the additional quantum processing units are configured to receive and process data preprocessed by the quantum processor unit 103.

Figure 2:
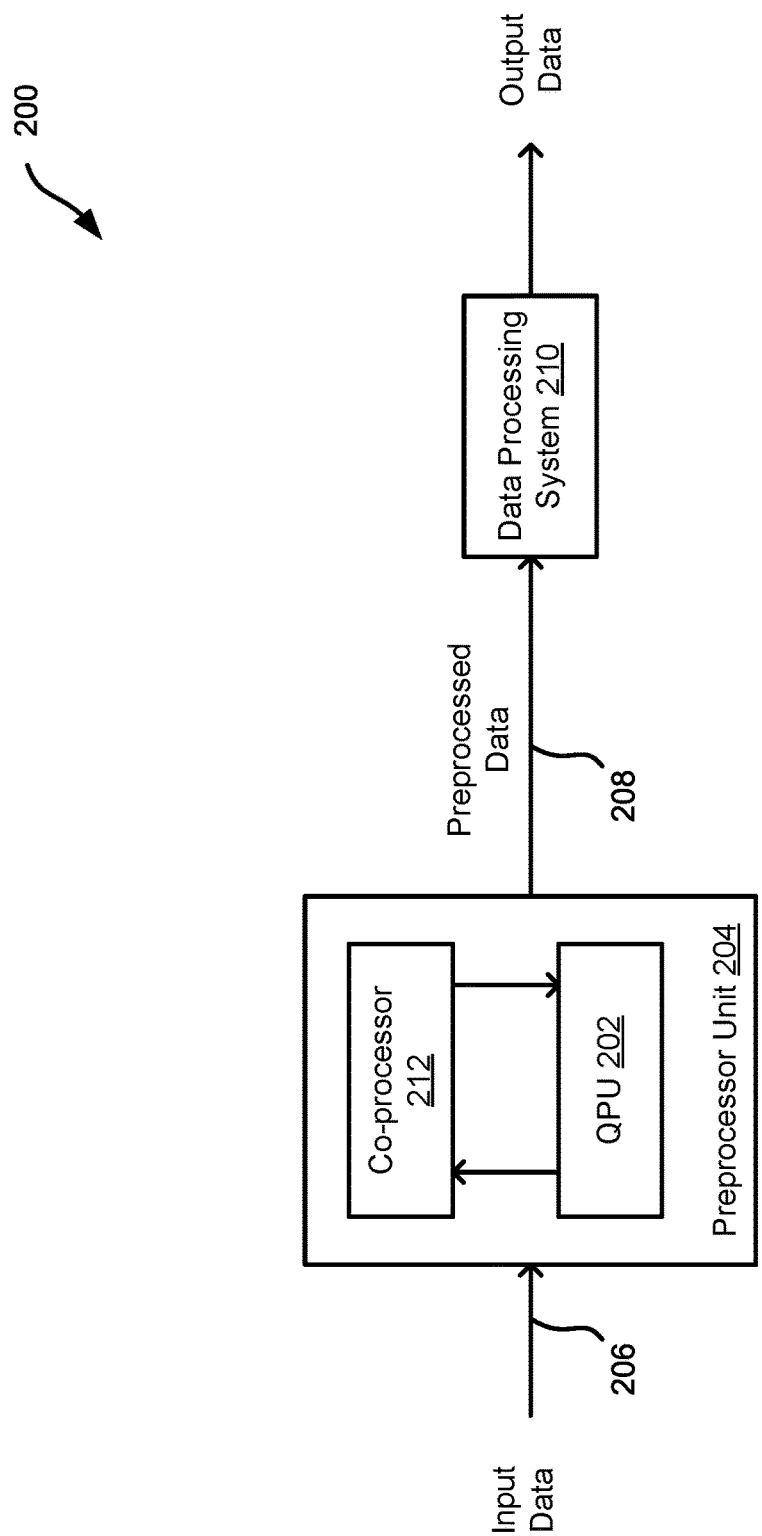
FIG. 2 is a schematic diagram of an example computer system that uses a quantum processor unit (QPU) to preprocess data.

FIG. 2 is a schematic diagram of an example computer system 200 that uses a quantum processor unit (QPU) 202 to preprocess data. The example computer system 200 includes a preprocessor unit 204 and a data processing system 210. The elements of the computer system 200 can be implemented, for instance, as elements in the example computing environment 101 or in another manner. As an example, the preprocessor unit 204 can be implemented as the quantum processor unit 103, and the data processor system 210 can be implemented as one or more of the access nodes 110 or other computing resources 107 or can be implemented on the server 108. The computer system 200 may include additional or different features.

The quantum processor unit 202 is part of a preprocessor unit 204 that is operable to receive unprocessed input data 206 and generate preprocessed data 208 for a computer process executed by the data processing system 210. The preprocessor unit 204 also includes a co-processor 212 that communicates with the quantum processor unit 202. For instance, the co-processor 212 may be implemented as the controllers 106 or the server 108 in FIG. 1 or in another manner. The coprocessor 212 is operable to receive the input data 206, generate randomized parameters for a parameterized quantum circuit based on the input data 206, invoke the QPU 202 to execute the parameterized quantum circuit, and generate the preprocessed data 208 based on output from the QPU 202. The preprocessor unit 204 may include additional or different features and components.

The data processing system 210 can execute a computer process (e.g., a machine learning algorithm or another type of computational process) that is configured to receive one or more inputs. The input data 206 may represent information to be processed by an execution of the computer process by the data processing system 210. For instance, the input data 206 may represent a data set to be classified, such as numerical feature vectors characterizing an image. The preprocessor unit 204 acts upon this information to produce preprocessed data 208, which is subsequently supplied to the data processor system 210 as the one or more inputs for the computer process. For example, the preprocessed data 208 may be communicated to the data processor system 210 over a remote data connection (e.g., a network or other remote connection) or a local data connection (e.g., a data bus or other local connection). In producing the preprocessed data, the co-processor 212 uses random numbers (e.g., one or more random matrices) to embed the input data 206 into quantum control parameters for manipulating the states of qubits defined in the quantum processor unit 202.

In some aspects, the input data 206 are classical data that the preprocessor unit 204 transforms by first encoding the classical data into control parameters of a quantum logic circuit, and then measuring the quantum states produced by the quantum logic circuit executed by the QPU 202. The results of measuring the quantum states produced by many different quantum logic circuits (each parameterized, for example, by the same classical data combined with different random numbers) may then be collected into a single, large feature vector, which is then provided to the data processor system 210 as the input for the computer process.

In some aspects, the example computer system 200 represents a hybrid computer system that includes both classical and quantum information processing capabilities. For instance, the preprocessor unit 204 may be configured to process quantum information (e.g., by operation of the quantum processor unit 202), and the data processor system 210 may be configured to process classical information (e.g., by operation of a digital microprocessor, digital logic circuitry, or another type of classical data processor). In some implementations, the data processor system 210 can be or include another quantum processor unit, and the data processor system 210 may receive classical or quantum information from the preprocessor unit 204.

In some cases, the preprocessor unit 204 computes random parameters for multiple iterations of a quantum logic circuit that is executed by the QPU 202 on an individual input vector, and a different set of random parameters can be computed for each iteration. The random parameters for all iterations applied to an individual input vector can then be saved and re-used for preprocessing other input vectors.

In some aspects of operation, the preprocessor unit 204 executes four stages of operation to prepare preprocessed input data 208 from unprocessed input data 206, and the preprocessed input data 208 may then be provided to a computer process (e.g., a machine learning algorithm or other process) executed by the data processing system 210. Although four stages of operation are described, each stage can include multiple steps or iterations, certain stages may be performed in parallel or another order, or the preprocessor unit 204 may operate in another manner.

In a first stage of operation, the input data 206 are embedded into quantum control parameters. In some implementations, the input data 206 and a set of random numbers are used to compute randomized parameters for a quantum logic circuit; for instance, randomized parameter values may be assigned to variable parameters of a quantum logic circuit. As an example, the input data 206 can be a dataset of N records (e.g., representing images to be processed by a machine learning algorithm), each of which is represented by a p-dimensional vector which can, in some examples, can be formatted as an input vector x. In some examples, the preprocessor unit 204 embeds this input vector into a quantum process that acts on Q qubits by using a random matrix $$\alpha = \begin{pmatrix} \omega_0^T & 0 & 0 \\ 0 & \ddots & 0 \\ 0 & 0 & \omega_Q^T \end{pmatrix} x + \beta$$

where Q random embedding vectors ($\omega^T$) act on subparts of the input vector. The elements of the random embedding vectors can be drawn from a probability distribution (e.g., by sampling a normal distribution or another type of probability distribution), and the Q-dimensional bias vector ($\beta$) can be drawn from another probability distribution (e.g., by sampling a uniform distribution or another type of probability distribution). The choice of these probability distributions can specify an implicit kernel associated with a feature map. The example parameter vector ($\alpha$) has Q components which the co-processor 212 uses to parameterize quantum logic gates in a quantum logic circuit executed by the QPU 202. For instance, the parameter vector ($\alpha$) may specify rotation angles for single-qubit rotation gates (e.g., an RX gate, an RY gate, an RZ gate, or another type of single-qubit rotation) on each qubit, for two-qubit controlled rotation gates or for other types of quantum logic gates that have a variable parameter.

During the first stage of operation, the co-processor 212 computes the parameter vector ($\alpha$) and uses the parameter vector ($\alpha$) to parameterize a quantum logic circuit that is executed by the QPU 202. An example quantum logic circuit is shown in FIG. 3B; another quantum logic circuit may be used. In some cases, the QPU 202 is initialized to an initial quantum state, and the quantum logic circuit parameterized by the parameter vector ($\alpha$) is applied to the initial state to produce an output quantum state. In some examples, the initial quantum state is the ground state or another well-characterized quantum state. In some cases, the initial quantum state is an entangled state or another linear combination of computational basis states.

In a second stage of operation, sampling is performed. For instance, once the output quantum state is prepared by the QPU 202, a set of measurements can be applied to the qubits to obtain a bitstring with Q elements.

In a third stage of operation, the first and second stages are iterated or otherwise repeated, for example, until a terminating condition is reached. For instance, stages one and two can be repeated a total of M times (or a total of M episodes), which sample M different embeddings and measure M bitstrings of length Q. In some cases, the co-processor 212 can then choose a specific subset of L bits from the Q bits available in each of the M bitstrings. The choice of which L bits to keep effects the implied kernel and may therefore be considered part of the preprocessing algorithm. In various cases, all bits are selected (L=Q), only one bit is selected (L=1) or any integer number of bits between one bit and all bits are selected. In some cases, the co-processor 212 can stack the M bitstrings together and obtain an ML-dimensional feature vector based on the input vector x. In cases where L=Q an MQ-dimensional feature vector is obtained.

In a fourth stage of operation, additional feature vectors are calculated. In some implementations, having completed the first, second and third stages of operation, the co-processor 212 has computed M different embedding matrices ($\omega^T$) and M different bias vectors ($\beta$). These embedding tensors can be stored (e.g., in a classical memory of the preprocessor unit 204) to be reused. For instance, the M different embedding matrices ($\omega^T$) and M different bias vectors ($\beta$) may be viewed as a static part of a preprocessing program executed by the preprocessor unit 204, at least until the preprocessor 204 is reprogrammed or reinitialized. Equipped with these parameters, stages one, two, and three can be repeated for all N input vectors x. The result is N (ML) dimensional feature vectors.

After the fourth stage of operation, the feature vectors can be provided to the data processing system 210 as preprocessed data 208. For instance, the N preprocessed feature vectors can be provided as inputs into a linear classifier, based on a Linear Discriminant Analysis (LDA) or another type of machine learning system.

These four stages of operation provide an example of how input data can be advantageously preprocessed using a QPU. In some cases, the choice of quantum logic circuit, including which L qubits to include, and the choice of probability distributions that are sampled, determines the implied kernel of the feature map. In some aspects, the kernel defines a mathematical notion of similarity between the inputs, which is then used to classify the inputs.

In some cases, certain parameters in various stages of operation can be tuned or adjusted. For example, the following features may be tuned or adjusted to accommodate certain types of data or algorithms: the types of distributions used to sample a and 13, which includes the different distribution parameters (such as mean and variance of the normal distribution, the size of the uniform distribution, as well as the type of distribution used, such as Poisson, Gamma, Weibull, etc.); the number M of episodes; the number Q of qubits; the subset of qubits, of number L, to use in the feature vectors; the structure of the quantum logic circuits, including types of single-qubit rotations, types of entangling gates, and the connection graph of the entangling gates; the initial state of the qubits (e.g., ground state or another initial state).

In some implementations, a preprocessing system defines a relatively small number of hyperparameters (e.g., the number of episodes (M) and the variances or other parameters of the distributions sampled to obtain random numbers), and the preprocessing system may be tuned by adjusting the relatively small number of hyperparameters. In some cases, the number of random quantum logic circuits (specified by the number of episodes, M) can be adjusted (e.g., to be large enough) to avoid having too coarse a grain (which would lead to loss of information and poor feature definition), while the variances can be tuned (e.g., to be small enough) to avoid washing out the features of the input data. Accordingly, in some cases, the effects of these two hyperparameters (and/or potentially others) can be adjusted and balanced to provide good preprocessing results.

In some cases, various stages of operation can be modified or applied to other types of systems and algorithms. For example, multiple repetitions of the parameterized gates can be applied, leading to deeper circuits with more parameters;

different types of single-qubit quantum logic gates or multi-qubit quantum logic gates may be applied; different types of entangling gates may be applied; another structured circuit Ansätze may be used; the output feature vectors can be used with another type of computational process; etc.

Figure 3A:
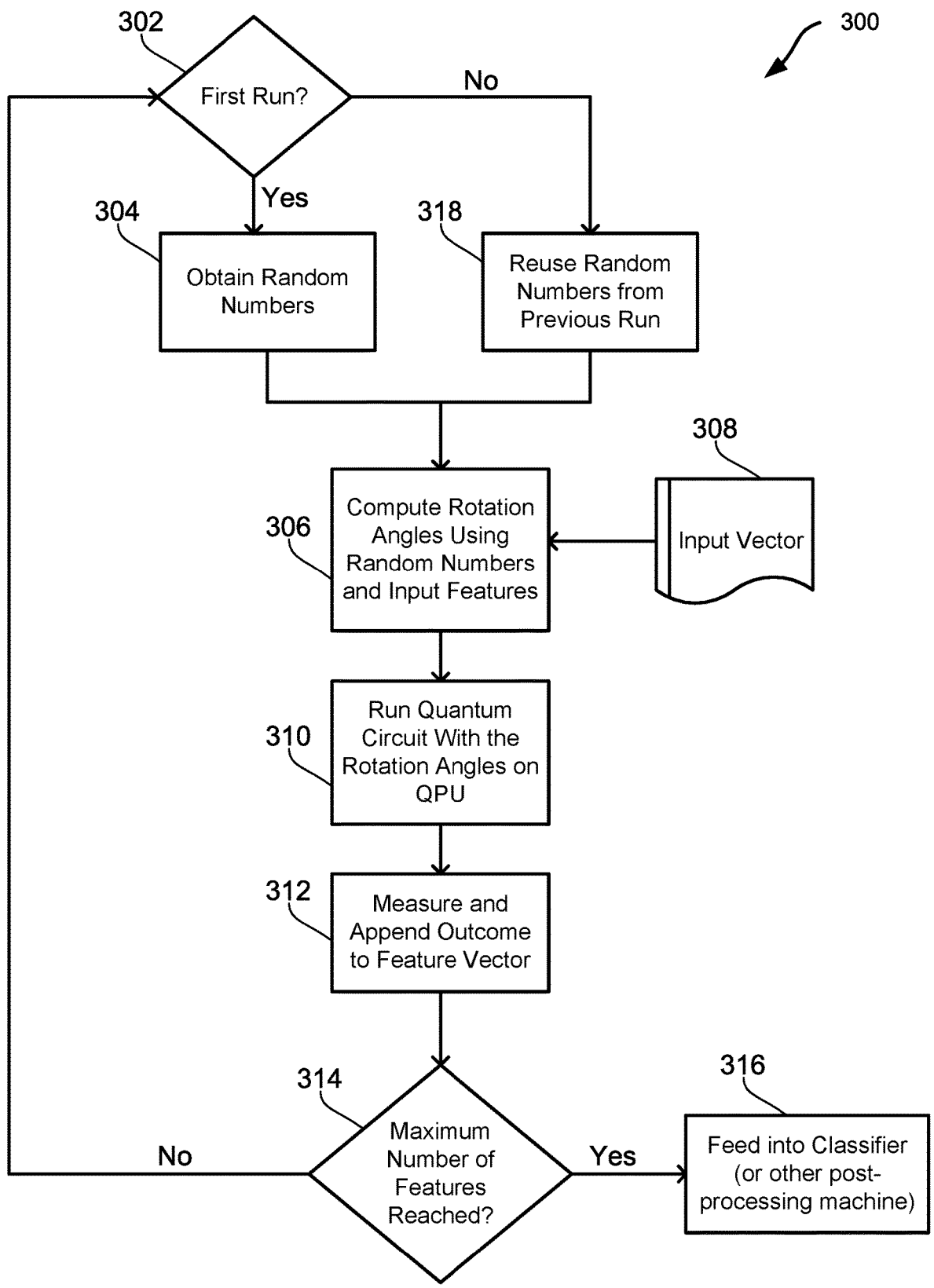
FIG. 3A is a flow diagram showing an example process for preprocessing data.
Figure 3B:
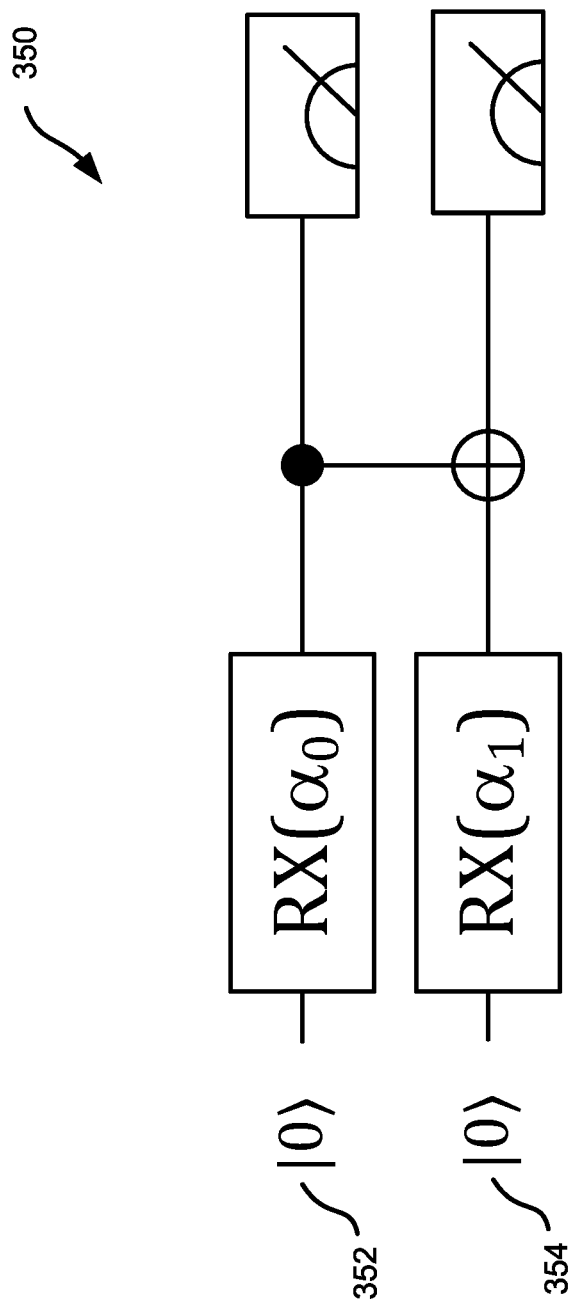
FIG. 3B is an example quantum logic circuit for preprocessing data.

FIG. 3A is a flowchart of an example process 300 for preprocessing input data using a quantum processor unit. In the example process 300 shown in FIG. 3A, some of the operations are performed by classical computing resources (e.g., a digital microprocessor or another type of classical data processing apparatus) and others are performed by quantum computing resources (e.g., a quantum processor). For example, in some implementations, all or part of operations 310 and 312 may be performed using a quantum processor unit, and all other operations may be performed by a classical co-processor or by a separate classical computer system. For instance, in the context of the computer system 200 shown in FIG. 2, the example process 300 can be performed by the preprocessing unit 204; with operations 310 and 312 invoking the quantum processor unit 202 and other operations being performed by the co-processor 212. As another example, in the example computing environment 101 shown in FIG. 1, executing the operations 310 and 312 in FIG. 3A may include storing and processing and measuring information in the quantum processor cell 102, while other operations in FIG. 3A may be executed by a classical processor (e.g., the controller 106, the server 108 or the additional computing resources 107). In some cases, the process 300 can be executed by other types of hardware.

The example process 300 may include additional or different operations, and the operations may be performed in the order shown or in another order. In some cases, one or more of the operations shown in FIG. 3A are implemented as processes that include multiple operations, sub-processes or other types of routines. In some cases, operations can be combined, performed in another order, performed in parallel, iterated, or otherwise repeated or performed another manner.

The example process 300 may be used to preprocess input data for, or otherwise in connection with, a variety of computer processes. For instance, the process 300 may be used to preprocess data for machine learning algorithms, such as supervised learning of a classifier, or other machine learning techniques. The process 300 includes an interrogatory 302 for determining whether an iteration of the example process 300 is a first run. During the first run, the process includes obtaining random numbers (at 304), such as from one or more probability distributions (e.g., a normal, uniform, or other type of probability distribution). Random numbers may be obtained, for example, from a pseudorandom number generator or another source of randomness. The random numbers may be used to produce Q random embedding vectors ($\omega^T$) and a Q-dimensional bias vector ($\beta$). For example, a normal distribution may be used to provide random numbers for the Q random embedding vectors ($\omega^T$) and a uniform distribution may be used to provide random numbers for the Q-dimensional bias vector ($\beta$).

The process 300 also includes computing rotation angles using the random numbers and input features (at 306) based on one or more input vectors 308. The input features may correspond to a data set of N records, each of which is represented by a p-dimensional vector, e.g., input vector x. In some examples, the input vector can be embedded into a parameterized quantum circuit to be executed by a quantum processor unit of Q qubits using a random matrix:

$$\alpha = \begin{pmatrix} \omega_0^T & 0 & 0 \\ 0 & \ddots & 0 \\ 0 & 0 & \omega_Q^T \end{pmatrix} x + \beta$$

with the Q random embedding vectors ($\omega^T$) acting on subparts of input vector x to produce a product vector. In this example, the Q-dimensional bias vector ($\beta$) is summed with the product vector to yield a parameter vector ($\alpha$). The parameter vector ($\alpha$) has Q components that are used to control single qubit parameterized rotation gates, e.g., an RX gate, on each qubit. As a specific example, given an image of 28×28 pixels (e.g., an MNIST number dataset), the image can be split into four 14×14 tiles. Four 196-dimensional embedding vectors ($\omega^T$) can be drawn from a probability distribution and acted upon each of the four 14×14 tiles, producing four random parameters. These random parameters can be used as parameters for corresponding single qubit rotation angles, e.g., to compute rotation angles.

FIG. 3B presents a schematic diagram of an example quantum logic circuit 350 that can be parameterized by the parameter vector ($\alpha$). The example quantum logic circuit 350 shown in FIG. 3B includes quantum logic gates applied to two qubits 352, 354 (i.e., Q=2 in this example) and thus the parameter vector ($\alpha$) has two components $\alpha_0$ and $\alpha_1$. The example quantum logic circuit 350 can be expanded to any larger number of qubits. For example, quantum logic circuit 350 can be expanded to include a single-qubit rotation on each qubit and a set of entangling gates applied over all qubits. Other example quantum logic circuits that may be used are shown in FIG. 2 of the publication entitled "Quantum Kitchen Sinks" by C. M. Wilson et al., arXiv: 1806.08321v1 [quant-ph] 21 Jun. 2018.

At 310 in the example process 300 shown in FIG. 3A, the quantum logic circuit parameterized with the computed rotation angles is executed on a QPU. In the example quantum logic circuit 350 shown in FIG. 3B, the two qubits 352, 354 are acted upon by respective single-qubit rotations (the RX gates shown) followed by an entangling gate applied to both qubits (the controlled-not (CNOT) gate shown) to prepare a Q-qubit quantum state. Other types of single-qubit rotations and entangling gates may be used in some cases. In the example quantum logic circuit 350 shown in FIG. 3B, both qubits 352, 354 start in a ground state, which is the "zero" computational basis state ($|0\rangle$ in FIG. 3B). The qubits may be initialized to another quantum state in some cases.

At 312, a readout of the qubits is performed, for example, using a single projective measurement over all qubits (a "single shot"), and the outcomes of a predetermined subset of L≤Q measurements are appended to a feature vector. In particular, once the Q-qubit quantum state is prepared, a single set of measurements can be made on the qubits, resulting in a single bitstring with Q elements, of which L bits are retained. In some implementations, the single set of measurements is repeated to obtain an ML-dimensional feature vector of input vector x. For instance, the aforementioned steps can be iteratively repeated M times (e.g., operations 304, 306, 310, and 312 may be repeated) to sample M different embeddings and M bit-strings of length L. After M iterations are completed, the M bit-strings of length L are stacked together to produce an ML-dimensional feature vector of input vector x.

The process 300 additionally includes an interrogatory 314 for determining whether a maximum number of features, N, has been reached. If so, the MQ-dimensional feature vector is fed into a classifier or another post-processing machine. If not, the process 300 returns to interrogatory 302 where the process 300 repeats, except that the random numbers from the previous run are reused (see block 318). In the example shown, the first run of the process 300 yields M different embedding matrices ($\omega^T$) and M different bias vectors ($\beta$). Such embedding tensors may form a static or quasi-static part of the quantum processor unit during second and subsequent runs of the process 300. For instance, this static or quasi-static component may be iteratively used for all N input vectors x, resulting in N (ML) dimensional feature vectors.

At 316, the feature vectors are provided to a data processing system, for example, as inputs to be processed. For instance, the N (ML) dimensional feature vectors may be supplied to a linear classifier, such as a Linear Discriminant Analysis, a Logistic Regression, a Linear Support Vector Machine, or another type of classifier.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-topeer networks (e.g., ad hoc peer-to-peer networks). A relationship of client and server may arise by virtue of computer programs running on the respective computers and having a client-server relationship to each other.

In a general aspect, a quantum processor unit (QPU) is used to preprocess input data for a computer process.

In a first example, input data (e.g., in input data 206 shown in FIG. 2, or another type of input data) are obtained for a computer process configured to run on a computer processing unit. By operation of a classical processor in a preprocessor unit (e.g., the co-processor 212 shown in FIG. 2 or another type of classical processor), randomized parameter values are computed for variable parameters of a quantum logic circuit. The randomized parameter values are computed from the input data and a set of random numbers. By operation of a quantum processor in the preprocessor unit (e.g., the QPU 202 shown in FIG. 2 or another type of quantum processor), the quantum logic circuit having the randomized parameter values assigned to the variable parameters is executed. The execution of the quantum logic circuit produces quantum processor output data. By operation of the classical processor in the preprocessor unit, preprocessed data (e.g., the preprocessed data 208 shown in FIG. 2 or another type of preprocessed data) are generated based on the quantum processor output data. The preprocessed data are provided as the input for the computer process configured to run on the computer processing unit (e.g., the preprocessed data may be provided to the data processing system 210).

In some instances, implementations of the first example may include one or more of the following features. The quantum logic circuit can be any type of parameterized quantum circuit. All or part of the parameterized quantum circuit may correspond to a unitary operator that depends on some or all of the randomized parameter values in a specified way (e.g., according to a map, function, transformation, etc.).

In some instances, implementations of the first example may include one or more of the following features. The set of random numbers may be obtained by sampling a probability distribution (e.g., as described with respect to operation 304 in FIG. 3 or otherwise). Computing the randomized parameter values may include computing randomized rotation angles, and the randomized rotation angles may be assigned to respective quantum logic gates in the quantum logic circuit (e.g., as described with respect to operation 306 in FIG. 3 or otherwise). The quantum logic gates may include, for example, single-qubit rotation gates, controlled (two-qubit) rotation gates, or another type of quantum logic gate that has a rotation angle as one of its variable parameters.

In some instances, implementations of the first example may include one or more of the following features. The quantum processor output may represent an output distribution generated by the quantum logic circuit. For example, the quantum processor output may correspond to expectation values of observables. For instance, in some cases, instead of only measuring the output of an episode once (per item, e.g., per image, in a data set), a preprocessor unit may instead estimate statistics over an ensemble of many measures of the same episode. For example, the preprocessor unit may determine the expectation value (average) of the measurement results or the covariance of the measurements results of a fixed episode. In some implementations, the preprocessor unit may be configured to determine any type of statistic of measurement outcomes, which may be provided as the output of the preprocessor unit and which may then be post-processed in any suitable manner.

The quantum logic circuit may include qubit measurements (e.g., as shown in FIG. 3B or otherwise), and the quantum processor output may include one or more bitstring from the qubit measurements. For example, one or more projective measurements of a computational state may be obtained. The bitstring from the qubit measurements can be a first bitstring. Generating the preprocessed data may include selecting a subset of bits from the first bitstring to produce a second, shorter bitstring.

In some instances, implementations of the first example may include one or more of the following features. An iterative process may be executed to produce the preprocessed data from the input data (e.g., as described with respect to the example process 300 in FIG. 3 or otherwise). The preprocessed data may be based on quantum processor output data from multiple episodes of the iterative process. One or more episodes of the iterative process may include: obtaining a new set of random numbers; computing a new set of randomized parameter values based on the input data and the new set of random numbers; and updating the preprocessed data based on quantum processor output data produced by an execution of the quantum logic circuit having the new set of randomized parameter values assigned to the variable parameters. One or more of the episodes may produce an output corresponding to an expectation value of an observable.

In some instances, implementations of the first example may include one or more of the following features. The input data may include an input vector (e.g., the input vector 308 in FIG. 3 or another type of input vector), and computing randomized parameter values may include computing random embedding vectors (e.g., the embedding vectors $\omega^T$ discussed above or otherwise) and a bias vector (e.g., the bias vector $\beta$ discussed above or otherwise). The random embedding vectors may include a first set of random numbers obtained by sampling a first probability distribution. The bias vector may include a second set of random numbers obtained by sampling a second probability distribution. A parameter vector (e.g., the parameter vector $\alpha$ discussed above or otherwise) that includes the randomized parameter values may be obtained by combining the input vector, the random embedding vectors and the bias vector. Each random embedding vector may act on a subpart of the input vector to generate the parameter vector.

In some instances, implementations of the first example may include one or more of the following features. The computer process can be a machine learning process or another type of process executable by a classical computer system. The quantum logic circuit may correspond to an implied kernel function. The computer process may correspond to non-parametric regression (e.g., fitting a line to a set of points without having a predetermined model for the line) using kernel regression.

In a second example, a hybrid classical-quantum computer system (e.g., in the computing environment 101 shown in FIG. 1 or another type of environment) includes a preprocessor unit that includes memory and one or more classical processors (e.g., in one or more of the controllers 106, computing resources 107, server 108 or access nodes 110 in FIG. 1) and one or more quantum processors (e.g., one or more of the QPUs 103 in FIG. 1). The memory stores instructions that when executed cause the hybrid classical-quantum computer system to perform one or more operations of the first example described above. In some implementations of the second example, the hybrid classical-quantum computer system may further include a classical computer system configured to receive the preprocessed data as input for the computer process and execute the computer process based on the preprocessed data.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method comprising:
   obtaining input data for a computer process configured to run on a computer processing unit;
   by operation of a classical processor, computing randomized parameter values for variable parameters of a quantum logic circuit, wherein the randomized parameter values are computed from the input data and a set of random numbers;
   causing a quantum processor to execute the quantum logic circuit having the randomized parameter values assigned to the variable parameters, wherein the execution of the quantum logic circuit produces quantum processor output data; and
   providing data derived from the quantum processor output data to the computer processing unit configured to run the computer process.

2. The method of claim 1, comprising obtaining the set of random numbers by sampling a probability distribution.

3. The method of claim 1, wherein a parameterized quantum circuit comprises the quantum logic circuit having the randomized parameter values assigned to the variable parameters, and at least a portion of the parameterized quantum circuit corresponds to a unitary operator that depends on some or all of the randomized parameter values.

4. The method of claim 1, wherein computing the randomized parameter values comprises computing randomized rotation angles, and the method comprises assigning the randomized rotation angles to respective quantum logic gates in the quantum logic circuit.

5. The method of claim 1, wherein computing the randomized parameter values comprises computing randomized rotation angles, and the method comprises assigning the randomized rotation angles to respective single-qubit rotation gates in the quantum logic circuit.

6. The method of claim 1, wherein the quantum processor output data represents an output distribution generated by the quantum logic circuit.

7. The method of claim 1, wherein the quantum logic circuit comprises qubit measurements, and the quantum processor output data comprises one or more bitstrings representing the qubit measurements.

8. The method of claim 7, wherein the one or more bitstrings representing the qubit measurements comprise a first bitstring, and the data comprises a second, shorter bitstring comprising a subset of bits produced from the first bitstring.

9. The method of claim 1, comprising executing an iterative process to produce the-data from the input data, wherein the data is derived based on quantum processor output data from multiple episodes of the iterative process, wherein one or more episodes of the iterative process comprises:
   obtaining a new set of random numbers;
   computing a new set of randomized parameter values based on the input data and the new set of random numbers; and
   updating the data based on quantum processor output data produced by an execution of the quantum logic circuit having the new set of randomized parameter values assigned to the variable parameters.

10. The method of claim 9, wherein the one or more episodes produce an output corresponding to an expectation value of an observable.

11. The method of claim 1, wherein the input data comprises an input vector, and computing the randomized parameter values comprises:
   computing random embedding vectors comprising a first set of random numbers obtained by sampling a first probability distribution;
   computing a bias vector comprising a second set of random numbers obtained by sampling a second probability distribution; and
   generating a parameter vector by combining the input vector, the random embedding vectors and the bias vector, wherein the parameter vector comprises the randomized parameter values.

12. The method of claim 11, wherein each of the random embedding vectors acts on a subpart of the input vector to generate the parameter vector.

13. The method of claim 1, wherein the computer process comprises a machine learning process executable by a classical computer system.

14. The method of claim 1, wherein the quantum logic circuit having the randomized parameter values assigned to the variable parameters corresponds to an implied kernel function.

15. A hybrid classical-quantum computer comprising:
   one or more classical processors; and
   memory storing instructions that, when executed by the one or more classical processors, cause the one or more classical processors to perform operations comprising:
      obtaining input data for a computer process configured to run on a computer processing unit;
      computing randomized parameter values for variable parameters of a quantum logic circuit, wherein the randomized parameter values are computed from the input data and a set of random numbers;
      causing one or more quantum processors to generate quantum processor output data, wherein the quantum processor output data are based on an execution of the quantum logic circuit having the randomized parameter values assigned to the variable parameters; and providing data derived from the quantum processor output data to the computer processing unit configured to run the computer process.

16. The hybrid classical-quantum computer system of claim 15, the operations comprising obtaining the set of random numbers by sampling a probability distribution.

17. The hybrid classical-quantum computer system of claim 15, wherein computing the randomized parameter values comprises computing randomized rotation angles, and the method comprises assigning the randomized rotation angles to respective quantum logic gates in the quantum logic circuit.

18. The hybrid classical-quantum computer system of claim 15, wherein the quantum processor output data represents an output distribution generated by the quantum logic circuit.

19. The hybrid classical-quantum computer system of claim 15, the operations comprising executing an iterative process to produce the data from the input data, wherein the data is derived based on quantum processor output data from multiple episodes of the iterative process, wherein one or more episodes of the iterative process comprises:

obtaining a new set of random numbers;

computing a new set of randomized parameter values based on the input data and the new set of random numbers; and updating the data based on quantum processor output data produced by an execution of the quantum logic circuit having the new set of randomized parameter values assigned to the variable parameters.

20. The hybrid classical-quantum computer system of claim 19, wherein the one or more episodes produce an output corresponding to an expectation value of an observable.

21. The hybrid classical-quantum computer system of claim 15, wherein the input data comprises an input vector, and computing the randomized parameter values comprises:

computing random embedding vectors comprising a first set of random numbers obtained by sampling a first probability distribution;

computing a bias vector comprising a second set of random numbers obtained by sampling a second probability distribution; and generating a parameter vector by combining the input vector, the random embedding vectors and the bias vector, wherein the parameter vector comprises the randomized parameter values.

22. The hybrid classical-quantum computer system of claim 15, further comprising the one or more quantum processor units and the computer processing unit, the computer processing unit comprising one or more classical processors configured to:

receive the data as input for the computer process; and execute the computer process based on the data.

* * * * *

UNITED STATES PATENT AND TRADEMARK OFFICE
CERTIFICATE OF CORRECTION

| | |
|---|---|
| PATENT NO. | : 11,960,972 B1 |
| APPLICATION NO. | : 18/151143 |
| DATED | : April 16, 2024 |
| INVENTOR(S) | : Otterbach et al. |

It is certified that error appears in the above-identified patent and that said Letters Patent is hereby corrected as shown below:

On the Title Page

Page 2, Column 1, Other Publications, Line 26 Delete "computions"," and insert -- computations", -- therefor Page 2, Column 2, Other Publications, Line 2 Delete "Leaming"," and insert -- Learning", -- therefor Page 2, Column 2, Other Publications, Line 63 Delete "regularizaiton," and insert -- regularization, -- therefor In the Specification Column 1, Cross-Reference to Related Applications, Line 8 Delete "9.2019," and insert -- 9, 2019, -- therefor Column 12, Detailed Description, Line 5 After "L=Q" insert -- , --

Column 12, Detailed Description, Line 38 Delete "a and 13," and insert -- α and β, -- therefor Column 14, Detailed Description, Line 46 Delete "(|0)" and insert -- (|0⟩ --

In the Claims

Column 20, Line 14 In Claim 9, delete "the-data" and insert -- the data -- therefor Column 22, Line 23 In Claim 22, after "claim 15," delete "¶"

Signed and Sealed this
Eighteenth Day of June, 2024

Katherine Kelly Vidal
*Director of the United States Patent and Trademark Office*